United States Patent [19]
Takahashi

[11] Patent Number: 6,039,391
[45] Date of Patent: *Mar. 21, 2000

[54] HATCH ROOF ATTACHING CONSTRUCTION FOR A T-BAR ROOF CAR

[75] Inventor: Tomoki Takahashi, Hamamatsu, Japan

[73] Assignee: Suzuki Motor Corporation, Hamamatsu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/676,637

[22] Filed: Jul. 10, 1996

[30] Foreign Application Priority Data

Aug. 15, 1995 [JP] Japan .................................. 7-207950

[51] Int. Cl.[7] ...................................................... B60J 7/11
[52] U.S. Cl. ........................................... 296/218; 296/224
[58] Field of Search ..................................... 296/218, 224

[56] References Cited

U.S. PATENT DOCUMENTS

| 4,626,026 | 12/1986 | Hasegawa | 296/218 |
| 4,729,596 | 3/1988 | Fujihara et al. | 296/218 |

FOREIGN PATENT DOCUMENTS

| 2937119 | 4/1981 | Germany | 296/218 |
| 3337933 | 6/1985 | Germany | 296/218 |
| 84625 | 5/1984 | Japan | 296/218 |
| 45426 | 3/1985 | Japan | 296/224 |
| 403239630 | 10/1991 | Japan | 296/218 |

*Primary Examiner*—Dennis H. Pedder
*Attorney, Agent, or Firm*—Alston & Bird LLP

[57] ABSTRACT

The present invention provides a hatch roof attaching construction for a T-bar roof car in which a car roof is formed with a pair of openings at the right and left of a roof center provided at the center of the roof and detachable hatch roofs are formed at the openings so as to be opened/closed, wherein the roof center 3 is provided with a center hook 9 having concaves 9a formed at both sides thereof to accommodate the inside edge 5a of the hatch roof 5, one of engaging members 11, 15 engaging with each other is mounted on the upper surface of the roof center 3 at each side of the center hook 9, and the other of the engaging members 11, 15 is mounted on the inside lower surface of said hatch roof 5.

6 Claims, 5 Drawing Sheets

HATCH ROOF ATTACHING CONSTRUCTION FOR A T-BAR ROOF CAR

FIELD OF THE INVENTION AND RELATED ART STATEMENT

The present invention relates to a hatch roof construction for a T-bar roof car, which can reliably fix hatch roofs provided at roof openings of a T-bar roof car.

FIG. 9 shows a roof of a T-bar roof car.

This roof 100 is formed with a pair of openings 102 at the right and left of a roof center 101 provided at the center, and detachable hatch roofs 103 are formed at the openings 102 so as to be opened/closed.

As shown in FIG. 10, the hatch roof 103 has a hatch roof molding 104 at the periphery thereof. The inside end of the hatch roof 103 is inserted in a concave 106 of a center hook 105 provided at the roof center 101, and the hatch roof 103 is fixed to the roof 100 by means of lock pins 107 provided at the front and rear ends of the hatch roof 103.

The lock pin 107 is configured so as to be protruded by means of a lock handle (not shown) provided at the inside end of the hatch roof 103. The lock pin 107 is locked by being inserted in a pin hole (not shown) formed at the end of the opening 102.

According to the conventional hatch roof attaching construction described above, a step portion 108 of the hatch roof molding 104, provided at the inside end of the hatch roof 103, is engaged with an edge 109 of the center hook 105 to prevent the hatch roof 103 from coming off.

A weather strip 110 is mounted at each end edge of the roof center 101 to fulfil a sealing function by being caused to abut on the lower surface of the hatch roof 103.

However, according to the prior art described above, although the step portion 108 of the hatch roof molding 104 is engaged with the edge 109 of the center hook 105 to prevent the hatch roof 103 from coming off, there is a space on the lower side of the hatch roof molding 104. Therefore, the inside end of the hatch roof 103 is easy to move from the set position thereof in the concave 106 of the center hook 105, so that there is a possibility that the hatch roof 103 cannot be fixed firmly.

Also, since the step portion 108 of the hatch roof molding 104 must be engaged with the edge 109 of the center hook 105, the installation and forming of the hatch roof molding 104 are troublesome.

OBJECT AND SUMMARY OF THE INVENTION

An object of the present invention is to provide a hatch roof attaching construction of a T-bar roof car, which can solve the above problems and reliably position and fix the hatch roof.

To solve the above problems, the present invention provides a hatch roof attaching construction for a T-bar roof car in which an automotive roof is formed with a pair of openings at the right and left of a roof center provided at the center of the roof and detachable hatch roofs are formed at the openings so as to be opened/closed, wherein the roof center is provided with a center hook having concaves formed at both sides thereof to accommodate the inside edge of the hatch roof, one of engaging members engaging with each other is mounted on the upper surface of the roof center at each side of the center hook, and the other of the engaging members is mounted on the inside lower surface of the hatch roof.

Also, the present invention provides a hatch roof attaching construction for a T-bar roof car in which an automotive roof is formed with a pair of openings at the right and left of a roof center provided at the center of the roof and detachable hatch roofs are formed at the openings so as to be opened/closed, wherein the roof center is provided with a center hook having concaves formed at both sides thereof to accommodate the inside edge of the hatch roof, one of engaging members engaging with each other is screwed to the upper surface of the roof center at each side of the center hook, and the other of the engaging members is bonded to the inside lower surface of the hatch roof, a hatch roof molding, which abuts on the inside of the concave of the center hook, is mounted to at least the inside edge of the hatch roof, and a weather strip, which abuts on the lower surface of the hatch roof, is mounted at the edge of the opening.

Further, the present invention is characterized in that hooks having a claw in the car width direction are used as the engaging member, and the hooks are arranged on the upper surface of the roof center and on the inside lower surface of the hatch roof so as to engage with each other in the car width direction.

Still further, the present invention is characterized in that lock pins, which can be protruded by a handle operation, are provided on both side surfaces at the front and rear of the hatch roof, and insertion holes engaging with the lock pins are formed on the inner wall surfaces at the front and rear of the opening provided on the roof.

Also, the present invention is characterized in that a hatch roof molding, which abuts on the inside of the concave of the center hook, is mounted to at least the inside edge of the hatch roof, and a weather strip, which abuts on the lower surface of the hatch roof, is mounted at the edge of the opening.

The hatch roof attaching construction for a T-bar roof car in accordance with the present invention achieves the effects described below.

In a hatch roof attaching construction for a T-bar roof car in which an automotive roof is formed with a pair of openings at the right and left of a roof center provided at the center of the roof and detachable hatch roofs are formed at the openings so as to be opened/closed, the roof center is provided with a center hook having concaves formed at both sides thereof to accommodate the inside edge of the hatch roof, one of engaging members engaging with each other is mounted on the upper surface of the roof center at each side of the center hook, and the other of the engaging members is mounted on the inside lower surface of the hatch roof. Therefore, the positioning of hatch roof in the car width direction can be performed reliably by the engagement of the engaging members. Also, a double locking construction of hatch roof can be provided by the engagement of the engaging members together with the fixing of the inside edge of hatch roof by means of the concave. Further, the inside edge of hatch roof is disposed in the concave of the center hook, and the lower surface of hatch roof is fixed by the engagement of the engaging members. Therefore, the engaging member has a function as a down stopper, so that the positioning in the vertical direction is performed reliably. The function of the engaging member as a down stopper improves the sealing property and offers an advantage of preventing noise caused by the traveling through the air.

Also, in a hatch roof attaching construction for a T-bar roof car in which an automotive roof is formed with a pair of openings at the right and left of a roof center provided at the center of the roof and detachable hatch roofs are formed at the openings so as to be opened/closed, the roof center is provided with a center hook having concaves formed at both sides thereof to accommodate the inside edge of the hatch roof, one of engaging members engaging with each other is screwed to the upper surface of the roof center at each side of the center hook, and the other of the engaging members is bonded to the inside lower surface of the hatch roof, a hatch roof molding, which abuts on the inside of the concave of the center hook, is mounted to at least the inside edge of the hatch roof, and a weather strip, which abuts on the lower surface of the hatch roof, is mounted at the edge of the opening. Therefore, the improvement in sealing property and rigidity can be achieved.

Further, the present invention is characterized in that hooks having a claw in the car width direction are used as the engaging member, and the hooks are arranged on the upper surface of the roof center and on the inside lower surface of the hatch roof so as to engage with each other in the car width direction. Therefore, the fixing in the car width direction can be performed reliably.

Still further, the present invention is characterized in that lock pins, which can be protruded by a handle operation, are provided on both side surfaces at the front and rear of the hatch roof, and insertion holes engaging with the lock pins are formed on the inner wall surfaces at the front and rear of the opening provided on the roof. Therefore, the fixing can be performed reliably together with the fixing by means of the hooks and concaves.

Also, the present invention is characterized in that a hatch roof molding, which abuts on the inside of the concave of the center hook, is mounted to at least the inside edge of the hatch roof, and a weather strip, which abuts on the lower surface of the hatch roof, is mounted at the edge of the opening. Therefore, rainwater etc. entering the inside of the hatch roof is discharged to the outside through a groove, so that a sufficient sealing property can be obtained.

DETAILED DESCRIPTION OF PREFERRED EMBODIMENTS

Figure 1:
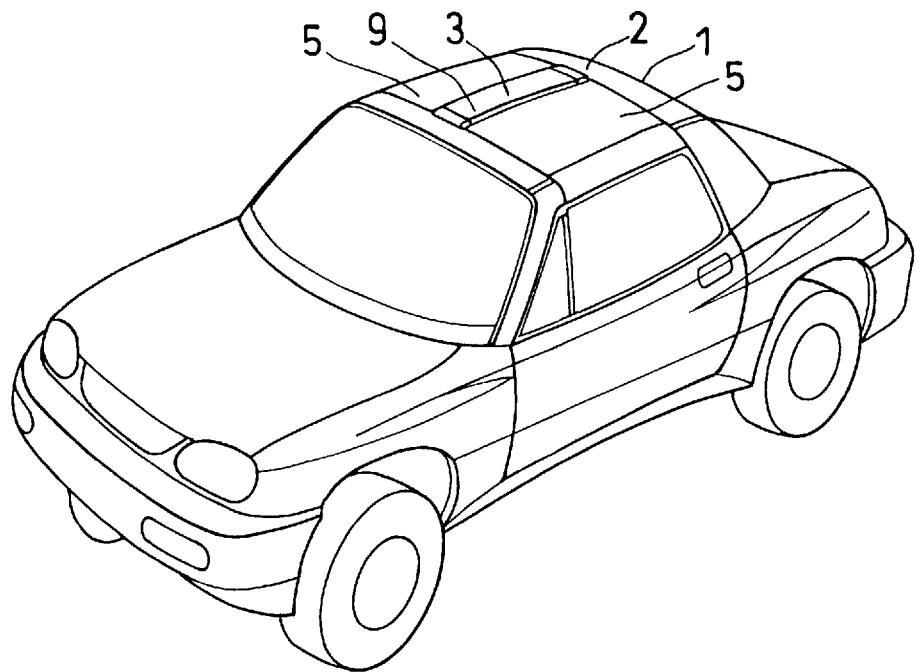
FIG. 1 is a perspective view showing a hatch roof attaching construction of a T-bar roof car in accordance with the present invention.
Figure 2:
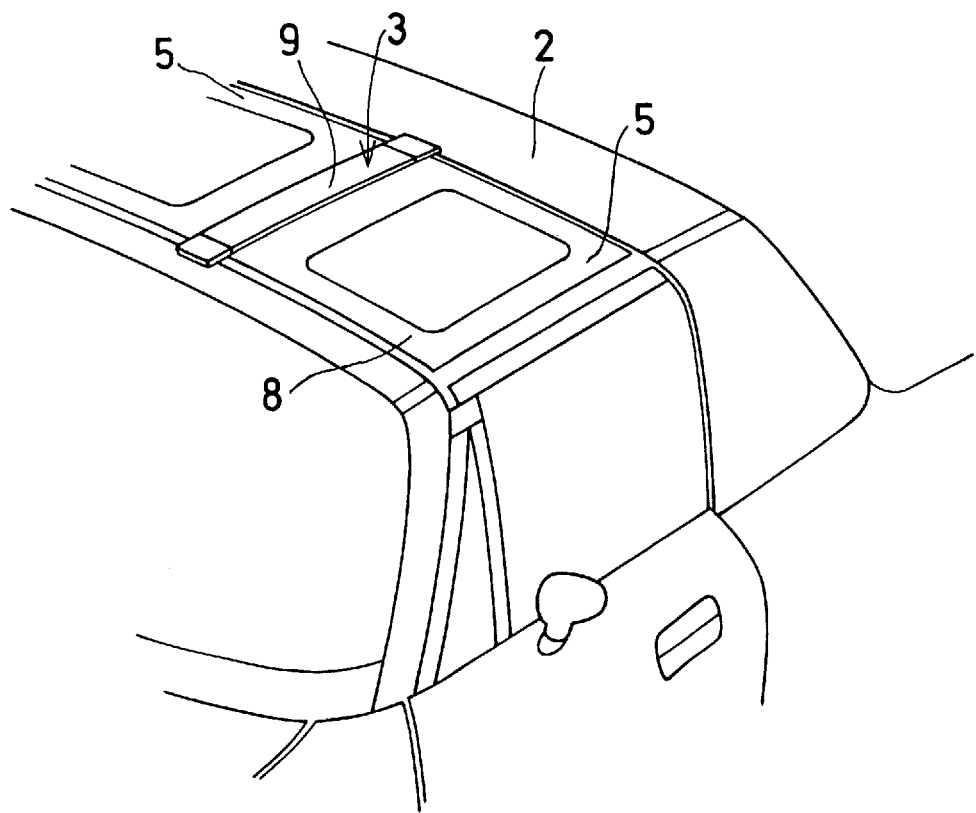
FIG. 2 is a partially enlarged view of FIG. 1.
Figure 3:
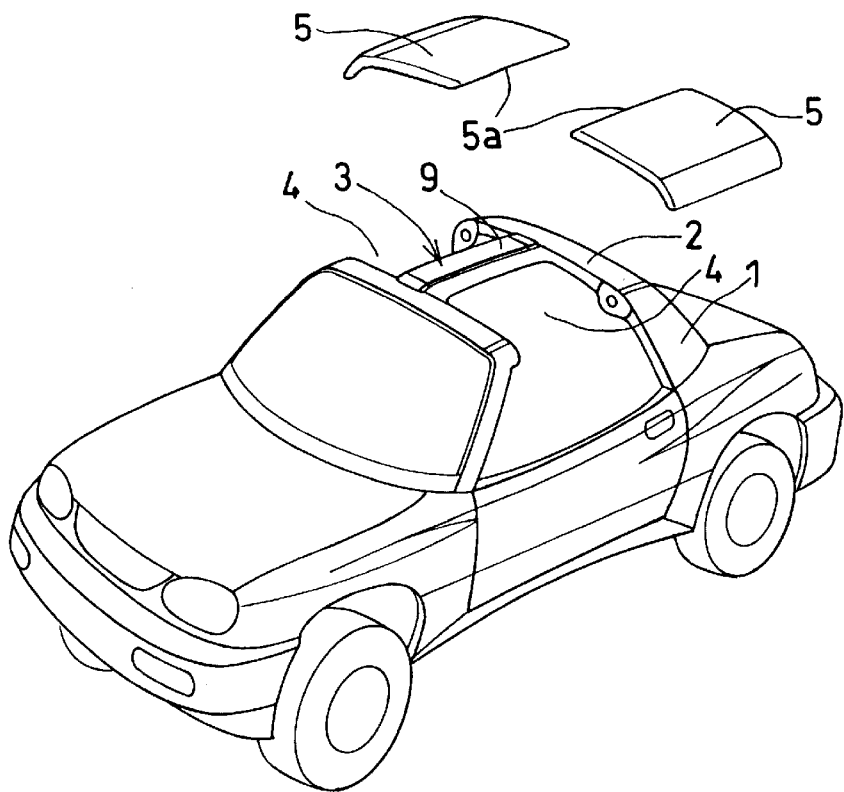
FIG. 3 is a perspective view of open state of hatch roofs, showing a hatch roof attaching construction of a T-bar roof car in accordance with the present invention.
Figure 4:
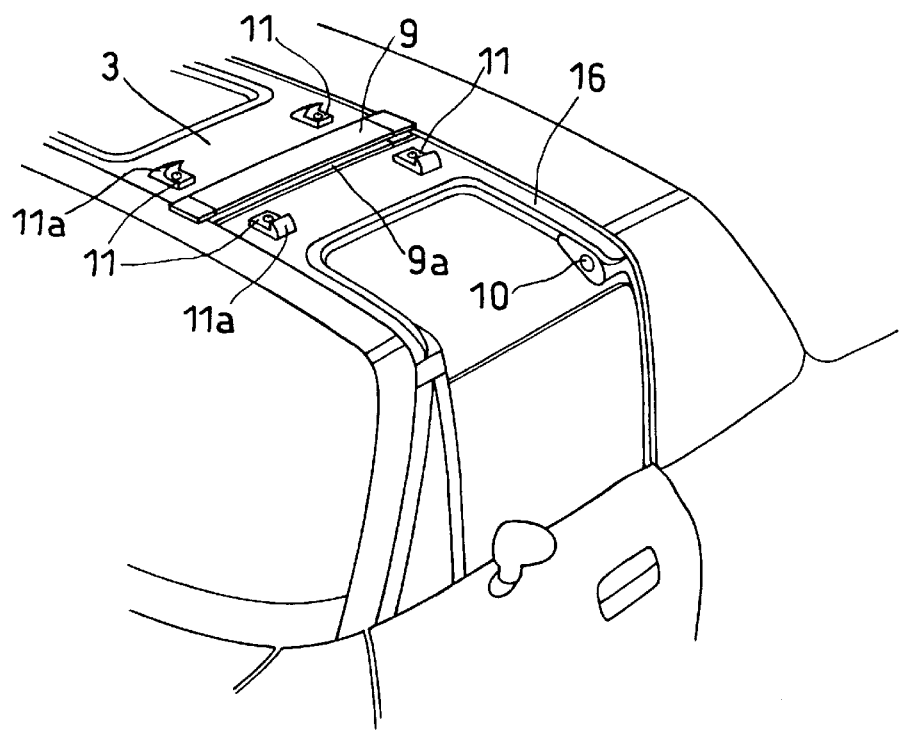
FIG. 4 is a partially enlarged view of FIG. 3.

One embodiment of the present invention will be described in detail with reference to the accompanying drawings.

In FIGS. 1 to 4, reference numeral 1 denotes a car body of a T-bar roof car.

Figure 5:
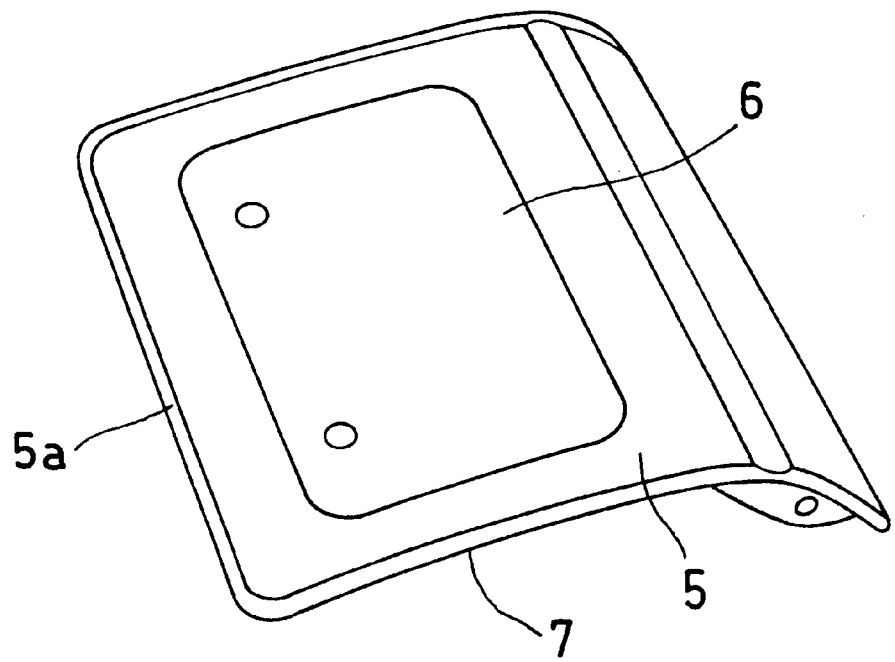
FIG. 5 is a perspective view of a hatch roof shown in FIG. 1.
Figure 6:
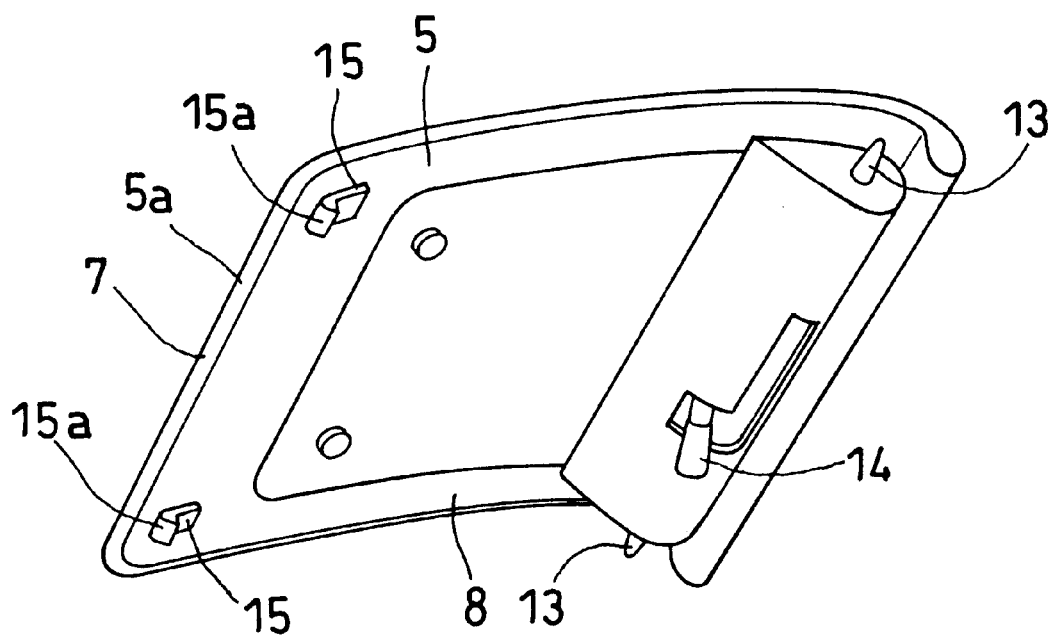
FIG. 6 is a perspective view of a hatch roof shown in FIG. 5, viewed from the back side thereof.

A roof 2 of the car body 1 is formed with openings 4, 4 at the right and left of a roof center 3 provided at the center of the roof 2. To these openings 4, 4, detachable hatch roofs 5, 5 are attached. The hatch roof 5 has a hatch roof molding 7 mounted at the edge of the hatch roof glass 6 as shown in FIGS. 5 and 6. To the periphery of the back surface of the hatch roof glass 6 is applied a ceramic print 8 for protection against the sun.

Next, the attaching construction of the hatch roofs 5, 5 is described. The roof center 3 at the center of the roof 2 is provided with a center hook 9 having a cross section of I shape. On each side of the center hook 9, a concave 9a with which the inside edge of the hatch roof 5 is engaged is formed. Also, an insertion hole 10 for a lock pin is formed on the inner wall surface at the front and rear of the opening 4.

Figure 7:
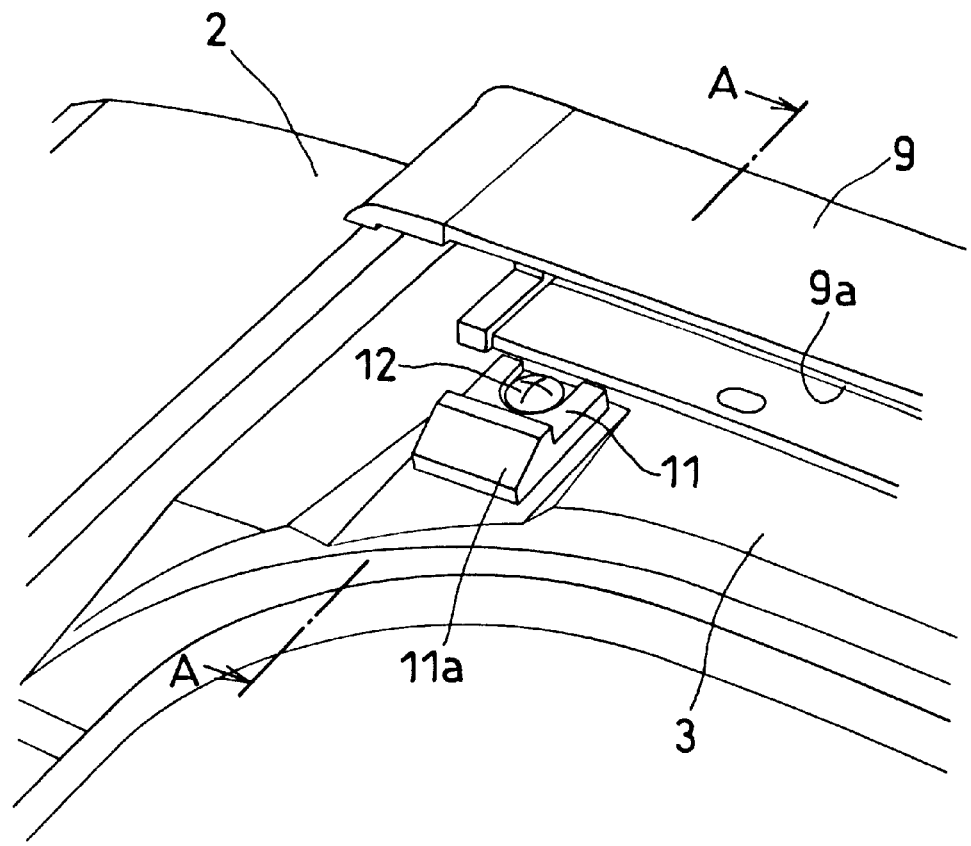
FIG. 7 is a perspective view showing a hook attaching portion.

On the upper surface of the roof center 3 on each side of the center hook 9, hooks (engaging members) 11 having a claw 11a in the car width direction are provided at a predetermined interval. The hook 11 is bonded to the roof center 3 with a double coated tape, and, as shown in FIG. 7, is fixed to the roof center 3 by means of a screw 12.

On the other hand, lock pins 13 engaging with the insertion holes 10 are provided in a protrusible manner on both side surfaces at the front and rear of the hatch roof 5. The lock pins 13 is operated by a handle 14 provided on the back surface of the hatch roof 5.

Figure 8:
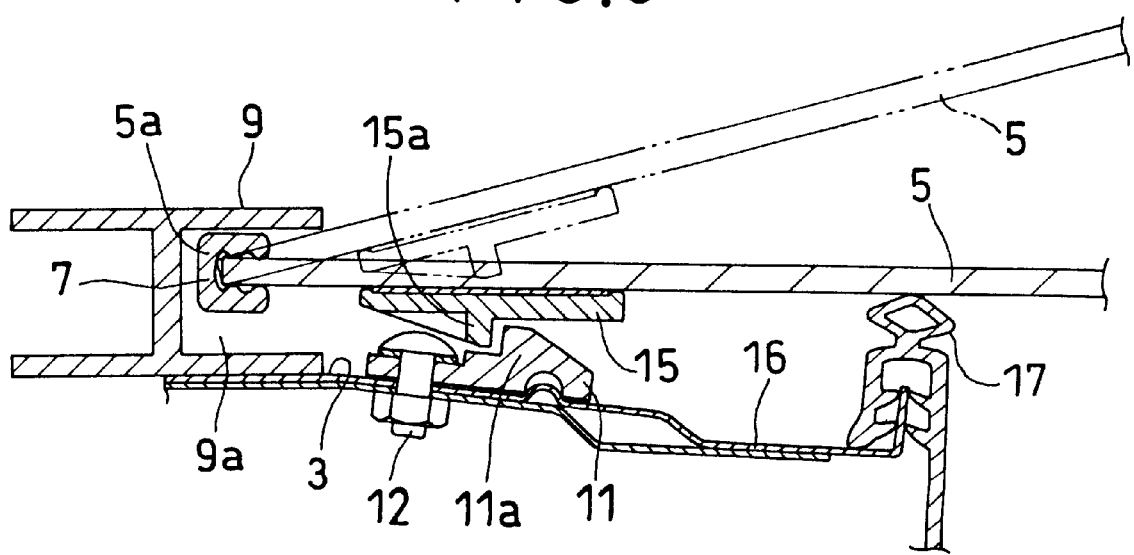
FIG. 8 is a sectional view taken along the line A—A of FIG. 7.
Figure 9:
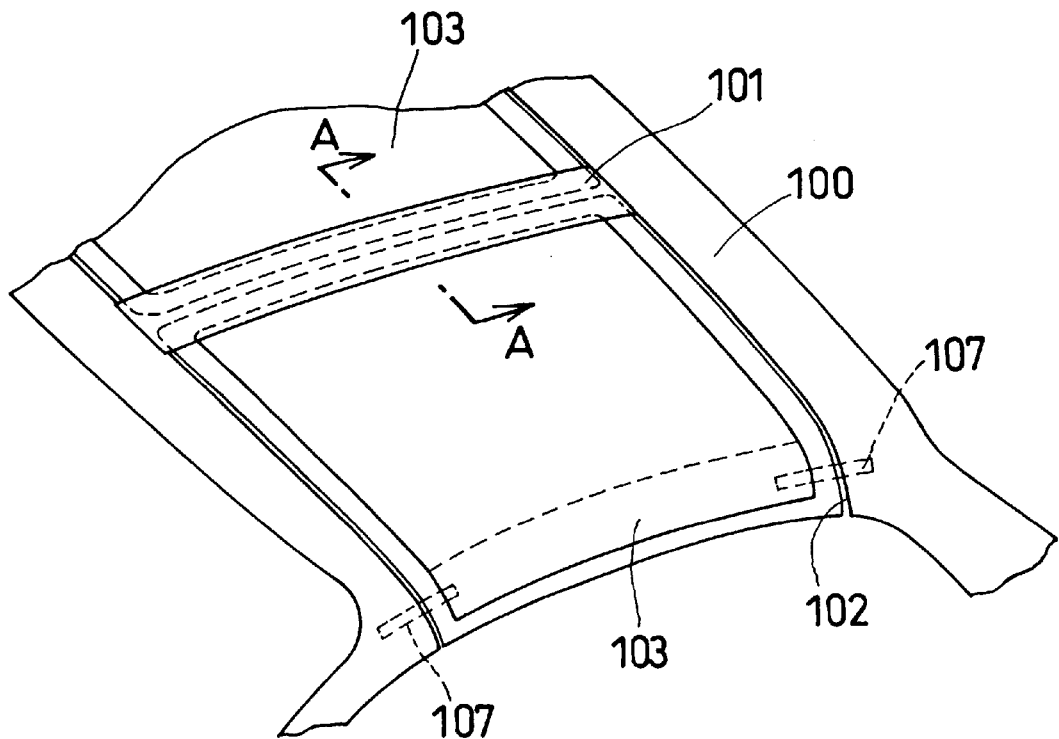
FIG. 9 is a perspective view showing a conventional hatch roof attaching construction of a T-bar roof car.
Figure 10:
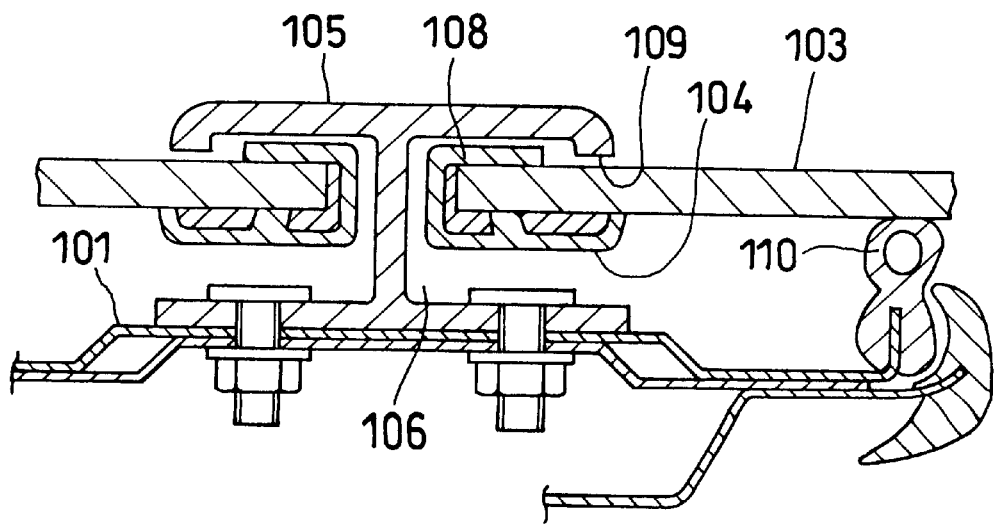
FIG. 10 is a sectional view taken along the line A—A of FIG. 9.

As shown in FIG. 8, on the back surface on the inside of the hatch roof 5, a hook (engaging member) 15 engaging with the hook 11 is provided.

This hook 15 is bonded to the back surface of the hatch roof 5 with urethane resin, and is provided with a claw 15a in the car width direction like the hook 11.

At the periphery of the roof 2 which is provided with the openings 4, 4, grooves 16 for draining are provided. At the edge of the groove 16, a weather strip 17 is mounted protruding upward.

According to the construction described above, when the hatch roof 5 is attached, an inside edge 5a of the hatch roof 5 is inserted into the concave 9a of the center hook 9, and the hatch roof 5 is mounted to the opening 4. At this time, the claws 15a of the hooks 15 are engaged with the claws 11a of the hooks 11 on the roof center 3 to fix the hatch roof 5. Then, by turning the lock handle 14, the lock pins 13 are protruded and engaged with the insertion holes 10. Thus, the hatch roof 5 is fixed by the lock pins 13, and also fixed by the hooks 11 and 15 engaging with each other.

When the hatch roof 5 is removed, the lock handle 14 is turned in the reverse direction to release the lock pins 13 from the insertion holes 10. When the hatch roof 5 is lifted by holding the outside thereof, the engagement of the hooks 11 with the hooks 15 is released. Thus, by pulling the hatch roof 5 out of the concave 9a of the center hook 9, the hatch roof 5 can be removed from the roof 2.

The removed hatch roofs 5 can be carried by being put one over another in a trunk room.

The above embodiment achieves the effects described below.

The roof center 3 is provided with the center hook 9 having concaves 9a formed at both sides thereof to accommodate the inside edges 5a of the hatch roofs 5, 5, the hooks 11 are screwed on the upper surface of the roof center 3 on both sides of the center hook 9, and the hooks 15 for engaging the hooks 11 are bonded to the inside lower surface of the hatch roof 5 with urethane resin. Therefore, a double locking construction is provided at the center by inserting the inside edge 5a of the hatch roof 5 into the concave 9a and by engaging the hooks 15 with the hooks 11, and also positioning can be performed in the car width direction, the vertical direction, and the longitudinal direction. Also, a reliable fixing construction can be achieved by fixing by means of lock pins 13, fixing by means of concaves 9a of the center hook 9, and fixing by means of the hooks 11 and 15 engaging with each other.

Further, the hatch roof molding 7, which abuts on the inside of the concave 9a of the center hook 9, is mounted to at least the inside edge 5a of the hatch roof 5, and the weather strip 17, which abuts on the lower surface of the hatch roof 5, is mounted at the edge of the opening 4. Therefore, rainwater etc. entering the inside of the hatch roof 5 is discharged to the outside through the groove 16, so that a sufficient sealing property can be obtained.

What is claimed is:

1. A hatch roof attaching construction for a T-bar roof car in which an automotive roof is formed with a pair of openings at the right and left of a roof center provided at the center of the roof and detachable hatch roofs are formed at the openings so as to be opened/closed, comprising:

a center hook provided at the roof center having concaves formed at both sides thereof to accommodate the inside edges of the corresponding detachable hatch roofs;

a weather strip mounted at the edge of each of the openings, said weather strip abutting the underside surface of the corresponding hatch roof when the hatch roof is in the closed position; and at least one pair of engaging members corresponding to each of the detachable hatch roofs, each pair of engaging members comprising first and second engaging members each of said engaging members comprising a claw, said first engaging member being mounted to the upper surface of the roof center in a predetermined position, said second engaging member being mounted on the underside surface of the hatch roof in a predetermined position such that said claws of said first and second engaging members engage with each other in the car width direction when the detachable roofs are in the closed position so that said roofs are reliably positioned in the car width direction with said inside edges thereof being secured in said concaves of said center hook.

2. A hatch roof attaching construction for a T-bar roof car according to claim 1 wherein said first engaging member is screwed to the upper surface of the roof center and said second engaging member is bonded to the underside surface of the respective hatch roof.

3. A hatch roof attaching construction for a T-bar roof car according to claim 1 further comprising a hatch roof molding mounted to at least the inside edge of each of the respective hatch roofs and abutting at least one interior surface of the corresponding concave of said center hook.

4. A hatch roof attaching construction for a T-bar roof car according to claim 1, further comprising a pair of lock pins corresponding to each of the detachable hatch roofs, said pair of lock pins being mounted on opposing sides of the respective hatch roof and being capable of being protruded by handle operation, and wherein the opposing inner wall surfaces of each of the openings define a pair of insertion holes corresponding to said pair of lock pins.

5. A hatch roof attaching construction for a T-bar roof car according to claim 1 wherein the automotive roof defines grooves for channeling moisture to the outside.

6. A hatch roof attaching construction for a T-bar roof car in which an automotive roof is formed with a pair of openings at the right and left of a roof center provided at the center of the roof and detachable hatch roofs are formed at the openings so as to be opened/closed, comprising:

a center hook provided at the roof center having concaves formed at both sides thereof to accommodate the inside edges of the corresponding detachable hatch roofs;

a weather strip mounted at the periphery of each of the openings, said weather strip abutting the underside surface of the corresponding hatch roof when the hatch roof is in the closed position; and at least one pair of engaging members corresponding to each of the detachable hatch roofs, each pair of engaging members comprising first and second engaging members each of said engaging members comprising a claw, said first engaging member being mounted to the upper surface of the roof center in a predetermined position, said second engaging member being mounted on the underside surface of the hatch roof in a predetermined position such that said claws of said first and second engaging members engage with each other in the car width direction when the detachable roofs are in the closed position so that said roofs are reliably positioned in the car width direction with said inside edges thereof being secured in said concaves of said center hook, and further wherein upper and lower horizontal surfaces of said first and second engaging members are positioned to engage each other to restrict downward movement of said hatch roof;

and wherein said first engaging member is screwed to the upper surface of the roof center and said second engaging member is bonded to the underside surface of the respective hatch roof; and further comprising a hatch roof molding mounted to at least the inside edge of each of the respective hatch roofs and abutting at least one interior surface of the corresponding concave of said center hook.

* * * * *